United States Patent

[11] 3,583,125

| [72] | Inventor | Emile Raymond Vermeulen<br>Ghent, Belgium |
|---|---|---|
| [21] | Appl. No. | 822,663 |
| [22] | Filed | May 7, 1969 |
| [45] | Patented | June 8, 1971 |
| [73] | Assignee | Sidaplax N. V.<br>Gentbrugge, Belgium |
| [32] | Priority | May 15, 1968 |
| [33] | | Great Britain |
| [31] | | 22966/68 |

[54] PRODUCTION OF PACKAGES
10 Claims, 3 Drawing Figs.

[52] U.S. Cl............................................. 53/14,
53/39, 53/133, 53/373
[51] Int. Cl....................................... B65b 61/18,
B65b 51/14
[50] Field of Search........................... 53/14, 39,
133, 329, 372, 373

[56] References Cited
UNITED STATES PATENTS

| 2,649,392 | 8/1953 | Marshall................ | 53/39 |
| 2,793,955 | 5/1967 | Selmer.................. | 53/14X |
| 3,298,158 | 1/1967 | Schmidt................ | 53/373X |
| 3,354,605 | 11/1967 | Amberg et al......... | 53/133X |

*Primary Examiner*—Theron E. Condon
*Assistant Examiner*—Neil Abrams
*Attorneys*—Michael J. Murphy and James C. Logomasini

ABSTRACT: A method and apparatus for heat sealing a thermoplastic sheet-type lid to a container by means of cooperating jaws, one of which is heated and contains an integral cutting edge for forming a line of weakness in the lid simultaneously with heat sealing to facilitate opening of the container. This jaw may optionally include a second outer cutting edge to aid in separating the lid from the remainder of the sheet.

PATENTED JUN 8 1971

3,583,125

INVENTOR.
EMILE R. VERMEULEN

BY
Michael J. Murphy
ATTORNEY.

PRODUCTION OF PACKAGES

BACKGROUND OF THE INVENTION

This invention relates to the production of packages, and particularly to a new process and apparatus for the production of packages having lids made from biaxially oriented resin sheets.

Biaxially oriented resin sheets are becoming increasingly used in such applications as packaging, where their properties have facilitated the introduction of mass production methods. Many such methods involve sealing a biaxially oriented lid to a container, which can for example be itself formed from a biaxially oriented sheet, injection molded or formed from aluminum. Such lids are very strong, and a problem arising from their use has been that, when it is required to open the package, this cannot be done without in most cases leaving jagged edges of the lid material adhering to the rim of the container; this defect is particularly serious where the container contains for example milk or some other drink and is intended to be used as a disposable cup.

A further difficulty can arise during the sealing operation itself. Although the lid can be a precut blank the accurate positioning of such a blank on the open container is a relatively slow operation and can hold up the whole packaging process, and it has accordingly been proposed to lay a continuous sheet of biaxially oriented resin across the tops of a series of containers, seal the sheet to the rims of the containers and subsequently cut away the unused portions of the sheet. However, although this last proposal represents a considerable improvement it has not met with complete success because the cutting dies need to be applied with enormous pressure in order to ensure complete severance and shreds of imperfectly cut material are very often left adhering to the finished package.

SUMMARY OF THE INVENTION

There have now been developed an improved process and apparatus for the production of packages having lids made from biaxially oriented resin sheet.

The process of the invention is one for the production of a package, in which a sheet of biaxially oriented thermoplastic resin is heat sealed to a rim of an open container so as to form a lid, a knife extending along an inner edge of the seal being simultaneously pressed into the heat-softened sheet to a depth substantially less than the thickness of the sheet, so that a line of weakness resulting from pressure of the knife on the inner edge of the seal facilitates opening of the package when required.

The invention also comprises an apparatus for producing a container by a process according to the invention, comprising a press having a pair of jaws suitable for heat sealing a sheet of biaxially oriented thermoplastic resin sheet to a rim of a container, and a knife extending along an inner edge of one of the jaws and operatively associated with the press so as to be pressed, simultaneously with a heat sealing operation, into the heat-softened sheet to a depth substantially less than the thickness of the sheet, so that a line of weakness resulting from the pressure of the knife on an inner edge of the seal facilitates opening of the package when required.

Also included within the invention is a package that has been produced by a process or apparatus according to the invention.

Preferably also a knife extending along an outer edge of the seal is simultaneously pressed into the heat-softened sheet to a depth not substantially greater than the sheet thickness so that a line of weakness resulting from pressure of this knife on the outer edge of the seal facilitates severance of the complete package from an unused portion of the sheet.

Biaxially oriented thermoplastic resins in sheet form are available commercially, and very suitable ones are the transparent sheets of bioriented polystyrene such as are sold under the name "Polyflex" (Registered Trade Mark). Other oriented resins can, however, be employed, for instance polyacrylates; polymethacrylates; polycarbonates, polyvinyl chloride; polyethylene terephthalate; isotactic polypropylene and styrene copolymers, for instance styrene-acrylonitrile copolymers.

The sheet can for instance have a thickness between 0.01 and 0.5 millimeter, particularly between 0.025 and 0.1 millimeter, such as for example 0.05 millimeter. Biaxially oriented sheet, thinner than 0.25 millimeter, is very often sold under the designation "film" but this is nevertheless for the purpose of this specification included in the term "sheet."

Preferably the container has a flange around its rim to which the sheet can be heat sealed, and it has been found preferable for the seal to be effected under conditions keeping to a minimum the tendency of the biaxial orientation to relax on heating. Thus, the seal is preferably made as narrow as possible consistent with the production of an effective seal, and for example perfectly satisfactory results can usually be obtained where the width of the heat seal is about 1 to 2 millimeters. Normally the seal extends as a closed line around the rim of the container, and a knife can extend along each of its outer and inner edges or along the inner edge only.

The knife that extends along the inner edge of the seal is pressed into the sheet to a depth less than the sheet thickness; the greater the depth, the easier it is to open the package, but there is a limit on the depth imposed by the necessity to avoid accidental opening of the package during transit. Preferably the depth is between one-quarter and two-thirds the sheet thickness, for example from one-third to one-half the sheet thickness. Preferably this knife extends completely around an inner edge of the seal to a substantially constant depth, so facilitating complete removal of the lid when required; alternatively there can be a gap in the knife so that the lid remains hinged to the container rim and may be temporarily reclosed.

When it is desired to open the package, this can be done by perforating the lid with a fingernail or a sharp instrument and tearing it away around the line of weakness produced by the knife.

Where the knife extends along an outer edge of the seal, it can be pressed into the sheet to a depth substantially equal to or substantially less than the thickness of the sheet, a depth substantially equal to the sheet thickness being normally appropriate where the package is to be separated from the unused portion of the sheet before it leaves the packaging factory, for separation is then very often substantially complete as the package leaves the heat-sealing press. There can be a weak, residual heat seal of the unused portion to the container rim but this can readily be broken without danger of tearing the lid, for example by conveying the completed package away from the heat-sealing apparatus in a substantially horizontal direction while sharply bending the unused portion upwards and away from the package. For example the sheet can be bent over a roller. The unused portion can then if desired be heat shrunk, ground up and reused as scrap resin.

A knife extending along an outer edge of the seal can alternatively be pressed into the sheet to the depth substantially less than the sheet thickness; this is normally done where it is intended that an unused portion of the sheet should remain so as to connect a number of packages into one unit, from which they can be separated as required. For example, this knife can be pressed into the sheet to a depth between one-quarter and three-quarters of the sheet thickness, very often from one-third to two-thirds of the sheet thickness. The depth is preferably substantially constant, but the knife can if desired be discontinuous so that the line of weakness does not extend completely around the seal although the latter arrangement is not normally preferred; alternatively the depth of the knife can vary along its length so that the strength of the joint between the unused portions and the container varies around the rim of the container. For example, the latter arrangement can be employed where it is desired to sever the lateral portions of unused sheet while leaving between adjacent packages a web that can be removed when required.

The temperature employed in the heat-sealing operation needs to be sufficient to ensure a proper seal, but should not be so great that the seal extends beyond the knife. A few experiments may be necessary to determine the best temperature to employ in any given set of circumstances, but as a general guide it can be said that for a biaxially oriented polystyrene sheet, a temperature between 125° and 175° C. preferably between 130° and 150° C. will be found suitable. Preferably the pressure is from 75 to 125 kilograms per square centimeter, for example from 90 to 100 kilograms per square centimeter, and the "press closed" time can for example be from 1.5 to 4 seconds preferably from 2 to 3 seconds.

BRIEF DESCRIPTION OF THE DRAWINGS

An example of an apparatus according to the invention will now be described with reference to the accompanying drawing in which.

DESCRIPTION OF THE PREFERRED EMBODIMENT

Figure 1:
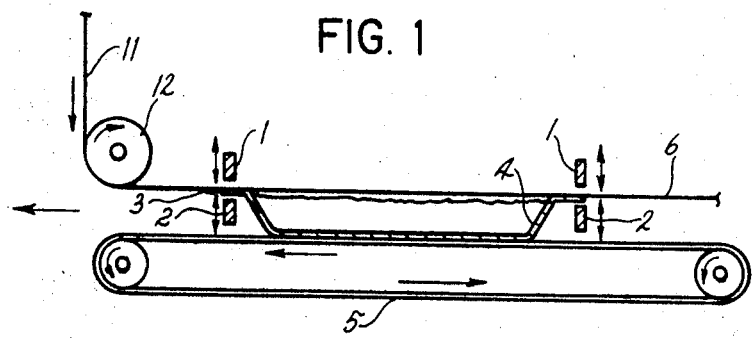
FIG. 1 is a vertical cross section showing the more important parts of the apparatus.
Figure 2:
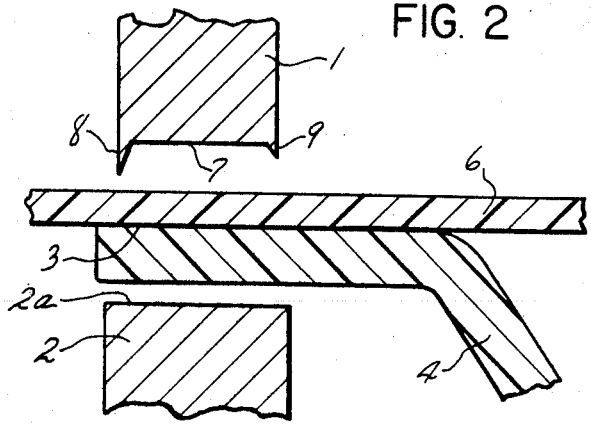
FIG. 2 is an enlarged cross section through the press jaws.
Figure 3:
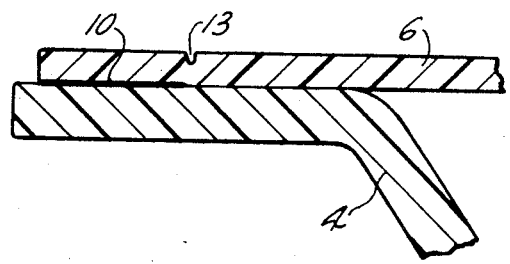
FIG. 3 is a similarly enlarged cross section of a completed seal.

The apparatus comprises a heat-sealing press having a pair of platens (not shown) respectively equipped with a heatable upper jaw 1 and an unheated lower jaw 2, both conforming generally in plan to the rim 3 of a container 4. In the example under consideration this plan is annular. A succession of open containers can be conveyed into the press and sealed containers out of the press (from right to left in FIG. 1) by a conveyor 5. The jaws are arranged for relative vertical movement so that when they come together a sheet of biaxially oriented resin 6 is heat sealed to the container rim, forming a lid. The width across the cross section of the jaw 1 as shown is preferably small, for example about 1 or 2 millimeters, so that the heat seal is correspondingly narrow. The lower jaw 2 has a flat operating surface 2a, but the upper jaw 1, has a flat portion 7 flanked by two knives 8 and 9 extending downwardly, the outer knife 8 having a vertical depth (measured downwardly from the flat portion) equal to the thickness of the biaxially oriented resin sheet. The depth of the inner knife 9 is one-third of this thickness. When the jaws come together, the sheet becomes heat sealed to the container, as represented by the heavy line 10 in FIG. 3, and at the same time the outer knife 8 cuts through the sheet so that the unused portion 11 of the sheet can be torn away as it bends upwards over the roller 12 in FIG. 1. The inner knife 9 produces an annular depression 13 at the inner edges of the heat seal and the resultant line of weakness can be used in opening the package when required.

The invention is applicable to the packaging of a wide range of liquids, semisolids and solid articles, including drinks, foodstuffs, toys or hardware.

The process of the invention is illustrated by the following example.

EXAMPLE

This example describes the production of a package by sealing a sheet of biaxially oriented resin to the rim of a container by a process according to the invention.

The apparatus employed was as described above and illustrated with reference to the drawing, the diameter of the annular jaws being about 7.5 centimeters and the width across the upper jaw being 1.5 millimeters. The upper jaw was heated to 150° C. and the lower jaw was unheated. A package in the form of a circular tray having an overall diameter 8 centimeters and a peripheral horizontal flange 7.5 millimeters wide was fed into the press simultaneously with a sheet of biaxially oriented polystyrene 0.075 millimeter thick. The press was closed for 2 seconds and on opening it was found that the sheet had become firmly heat sealed to the flange, forming a closed lid from which unused portions of the sheet had become detached. A line of weakness extending around the inner edge of the seal resulted from pressure of the inner knife on the lid. Opening of the package when required was a simple matter, the lid being perforated with the fingernail or point of a penknife and torn away along the line of weakness leaving no jagged edges or shreds of polystyrene behind.

It is obvious that many variations may be made in the method and apparatus set forth above without departing from the spirit and scope of the invention.

What I claim is:

1. A process for producing a sealed, easily opened package comprising the steps of compressing an edge portion of a biaxially oriented thermoplastic lid and a rim portion of an open container together under heat-sealing conditions of elevated temperature and pressure without substantially relaxing the stresses in said biaxially oriented lid to form a package wherein said lid and rim portion are heat sealed together, while simultaneously pressing a sharp edge into the lid inside the area of the heat seal to a depth less than the thickness of the lid to form a line of weakness in the lid to facilitate opening the package.

2. The process of claim 1 wherein the package comprises a plurality of adjacent containers integrally united with each other by means of their heat-sealed lids which are portions of a sheet, said process including the step of pressing one portion of another sharp edge into a first section of the sheet between adjacent containers to a first depth to form a first line of weakness, while pressing a second portion of said another sharp edge into a second outer section of the sheet to a second depth which exceeds the first depth to form a second line of weakness whereby the package may be readily separated from the sheet along said second line of weakness while the sealed containers may be readily separated individually from each other along the first line of weakness.

3. The process of claim 1 wherein the thermoplastic is polystyrene, the heat-sealing temperature is between 125° to 175° C. and the heat-sealing pressure is between 75 to 125 kilograms per square centimeter, being maintained for from 1.5 to 4 seconds.

4. A method of repeatedly producing sealed, easily opened packages comprising the steps of:
 a. placing successive portions of a biaxially oriented thermoplastic sheet in contact with rim portions of open containers;
 b. advancing a heated sealing jaw toward an opposing supporting jaw with each contacting successive sheet portion and container rim portion therebetween to force the heated jaw into each sheet portion under heat-sealing conditions of elevated temperature and pressure without substantially relaxing the stresses in said biaxially oriented sheet portions, thereby heat sealing each sheet portion to each container rim to form said packages;
 c. forcing a first sharp, heated edge into each sheet portion inside the area of its heat seal to a depth less than the thickness of the sheet simultaneously with said heat sealing to form a line of weakness in each sheet portion within its seal to facilitate opening each package;
 d. forcing a second sharp, heated edge into each sheet portion outside the area of its heat seal to a depth substantially equal to the thickness of the sheet simultaneously with said heat sealing to form another line of weakness to facilitate separating each sheet portion from the remainder of the sheet; and thereafter
 e. bending the remainder of the sheet about a curved surface in a direction away from the sheet portion heat sealed to each container to separate said remainder of the sheet from each package along said second mentioned line of weakness.

5. Apparatus for simultaneously heat sealing a lid to a container and for forming a line of weakness in the lid to facilitate opening the container, the apparatus comprising:
 a. a pair of jaws, at least one of which is movable with respect to the other;

b. means for heating at least one of said jaws to accommodate the heat sealing;

c. means for reciprocating at least one of said jaws toward the other to heat seal a lid portion to a container rim portion situated between said jaws;

d. one of said jaws having an integral knife which includes a continuous, planar oriented sharp, leading edge extending outwardly from the inner surface of said one of said jaws toward the other of said pair of jaws for partially penetrating the lid inside the heat seal to form said line of weakness in the lid.

6. The apparatus of claim 5 wherein the lid is a portion of a sheet and including another sharp edge integral with one of said jaws and spaced laterally from said first-mentioned edge for penetrating the sheet during heat sealing to facilitate separating the portion of the sheet defining the lid from the remainder thereof.

7. The apparatus of claim 5 wherein the length of the edge taken perpendicular to the face of the jaw on which it is mounted is between 0.0025 and 0.333 millimeter.

8. The apparatus of claim 5 wherein the jaws and sharp edge conform to the peripheral configuration of the container rim when viewed from above.

9. The apparatus of claim 6 wherein the length of the second-mentioned sharp edge taken perpendicular to the face of the jaw on which it is mounted is between 0.01 and 005 millimeter.

10. A process for producing a sealed, easily opened package comprising the steps of heat sealing a thermoplastic lid to a rim portion of an open container to form a sealed package while simultaneously pressing a sharp edge into the lid inside the area of the heat seal to a depth less than the thickness of the lid to form a line of weakness in the lid to facilitate opening the package, said pressing being interrupted to form a gap in the line of weakness which defines a hinged portion of the lid connected to the container rim at the heat seal to facilitate reclosing the package after opening by pivoting the hinged portion to the container about the heat seal.

PO-1050
(5/69)

UNITED STATES PATENT OFFICE
CERTIFICATE OF CORRECTION

Patent No. 3,583,125    Dated June 8, 1971

Inventor(s) Arnold J. Tenner

It is certified that error appears in the above-identified patent and that said Letters Patent are hereby corrected as shown below:

Claim 9, line 3, delete "005" and insert - - - 0.5 - - -

Signed and sealed this 9th day of May 1972.

(SEAL)
Attest:

EDWARD M.FLETCHER,JR.
Attesting Officer

ROBERT GOTTSCHALK
Commissioner of Patents